United States Patent Office 3,509,053
Patented Apr. 28, 1970

3,509,053
LUBRICANT ADDITIVES
Sidney John Branch, Hornsea, England, assignor, by mesne assignments, to Orobis Limited, London, England, a British company
No Drawing. Filed Aug. 2, 1967, Ser. No. 657,797
Claims priority, application Great Britain, Aug. 24, 1966, 37,887/66
Int. Cl. C10m 1/38, 1/32
U.S. Cl. 252—42.7
14 Claims

ABSTRACT OF THE DISCLOSURE

The invention is a process for making overbased lubricant additives. An alkyl phenol and sulphur are heated together in the presence of a catalyst such as sodium hydroxide. The product is further reacted with an oxide alkoxide or hydroxide of a metal of Group II-A of the Periodic Table and a specified amine compound, followed by carbonation.

---

The present invention relates to lubricant additives and in particular to basic lubricant additives.

In co-pending U.S. Patent 3,437,595 there is described a process for producing a basic lubricant additive which comprises heating an alkyl phenol and sulphur in the presence of a catalyst. The product is then further reacted with an alkaline earth metal oxide, alkoxide or hydroxide, vicinal glycol and carbon dioxide and the glycol is removed from the final product by distillation. However it is found that some of the glycol is retained in the final product and gives rise to foaming problems.

Foaming in for example crankcase oils is a serious problem since the production of excessive foam in the crankcase results in imperfect lubrication of the engine parts. Base oils do not in themselves give rise to foaming problems. Oils containing additives, however, frequently have undesirable foaming properties and it is desirable to produce additives which do not cause the foaming properties of the base oil to deteriorate.

It is an object of the present invention to provide a process giving improved lubricant additives, in particular additives having improved foaming characteristics.

Accordingly the present invention is a process for the production of a basic lubricant additive which comprises heating an alkyl phenol and sulphur in the presence of a catalyst, admixing the sulphurised product with a compound, as hereinafter defined, of a metal of Group II-A of the Periodic classification and an amine compound of general formula:

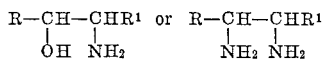

wherein R and R¹ are hydrogen atoms or alkyl groups, thereafter removing the amine compound from the mixture by distillation and adding carbon dioxide thereto. By a compound of a metal of Group II-A of the Periodic Table is meant an oxide, alkoxide or hydroxide. The preferred compounds are calcium hydroxide and barium oxide.

When the amine compound is a diamine, it should be removed from the reaction mixture prior to the addition of carbon dioxide, as carbon dioxide and diamines react to form an undesired by-product which interferes with subsequent processing. When the amine compound is a hydroxy-amine, this is not so important as the compound formed by reaction with carbon dioxide is an unstable one which breaks down and does not interfere with subsequent processing. Therefore, in a modification of the invention, when the amine compound is a hydroxy-amine it is not removed from the mixture until after the addition of carbon dioxide. Nevertheless it is preferred to remove the hydroxyamine prior to carbonation.

The alkyl phenol is preferably predominantly para substituted. Alkyl phenols prepared for example by the alkylation of phenol with olefins or alkyl halides are suitable. It is preferred to use alkyl phenols having from 8 to 50 carbon atoms in the alkyl substituent; compounds having from 8 to 24 are particularly preferred, for example dodecyl phenol.

Preferably the first stage of the reaction between sulphur and the alkyl phenol is effected in the presence as catalyst of an oxide, alkoxide, hydroxide or sulphide of an element of Group I-A or Group II-A of the Periodic Table. It is particularly preferred to use a Group I-A metal hydroxide, especially sodium hydroxide, as catalyst. The catalyst may be added as an aqueous solution.

It may be desired to remove the catalyst metal of Group I-A or II-A from the reaction mixture before the second stage of the reaction is carried out. This may be done by adding an acid such as phosphoric or sulphuric acid to form a salt which is insoluble in the reaction mixture. For example when sodium or potassium hydroxide is used as catalyst, the sodium or potassium may be removed by adding phosphoric acid and separating sodium or potassium phosphate.

The reaction mixture containing the alkyl phenol and sulphur may be heated to about 120° to 250° C., preferably to about 150° to 175° C.

In the second stage of the process addition of the Group II-A metal compound to the sulphurised alkyl phenol is preferably carried out after cessation of evolution of hydrogen sulphide from the first stage of the reaction. It is preferably added as a slurry with diluent oil, for example, 100 solvent neutral. It may be desired to add with the diluent oil a defoamant additive, for example a polymethylsiloxane, a dispersant for the neutralising earth, such as an alkaline earth petroleum sulphonate, and a further low viscosity diluent to aid processing. The low viscosity diluent may suitably be a $C_{10}$–$C_{15}$ alchohol such as tridecanol, a commercially available mixture of $C_{12}$ alcohols.

The amine compounds contains radicals R and $R^1$ which may be hydrogen or alkyl groups, preferably having from 1 to 3 carbon atoms. The compound may be for example ethanolamine or preferably ethylene diamine and is preferably added dropwise under atmospheric pressure, after addition of the slurry. The water formed during the reaction of the Group II-A metal compound and sulphurized alkyl phenol, and the bulk of the amine compound may then be removed from the reaction mixture suitably by distillation under atmospheric or reduced pressure. With ethylene diamine, distillation under reduced pressure until the kettle temperature reaches about 140°–160° C. will suffice.

Carbon dioxide is thereafter added, suitably by blowing in under pressure, the required amount being that sufficient to give a carbon dioxide content in the final product of between 3.0 and 7.0% by weight and preferably between 3.5 and 5.0% by weight. As stated earlier, according to a modification of the invention, when the amine compound is a hydroxy-amine, carbonation may take place before removal of the hydroxamine. When the alkaline earth used in calcium hydroxide, this corresponds to a carbon dioxide absorption of about 0.3 to 0.7 per mole of alkaline earth used. Undesired amine compound and other low boiling components are then removed from the final reaction product by distillation, which may be carried on until the kettle temperature rises above 200° C.

The invention is further illustrated by the following examples.

EXAMPLE 1

Dodecyl phenol (210 g.) was reacted with sulphur (50 g.) in the presence of 5 g. of sodium hydroxide, dissolved in a minimum amount of water, as catalyst. The reaction mixture was maintained at 150°–160° C. for 4 hours. The product was treated with 6 ml. of phosphoric acid and filtered hot to remove the sodium as sodium phosphate. To the filtered material were added calcium hydroxide (110 g.), a calcium petroleum sulphonate (24 g.), 240 ml. of diluent oil and 35 ml. of tridecanol. Ethanolamine (75 ml.) was carefully added as the temperature was raised to 100° C. Water was distilled from the system over a period of 2 hours and the temperature was allowed to rise to 140° C. At this stage the mixture was carbonated with 32 g. of carbon dioxide. The product was stripped of ethanolamine under vacuum at 180 to 190° C., and filtered hot. The product contained 8.15% calcium.

EXAMPLE 2

The same procedure was used as that given in Example 1 except that ethylene diamine (75 ml.) was used in place of ethanolamine and the ethylene diamine was removed from the mixture by distillation prior to the addition of carbon dioxide. The amount of calcium hydroxide used was also increased to 120 g. The product contained 8.7% calcium.

The products were tested for foaming characteristics according to the method of A.S.T.M. D892–58T sequence I. The tests were carried out on an oil solution of the products containing 0.8% by weight of calcium and 30 p.p.m. silicon foam inhibitor. The results are given in the table.

TABLE

|  | Foam Tendency | Foam Stability |
| --- | --- | --- |
| Example 1 | 440 | 200 |
| Example 2 | Nil | Nil |

I claim:

1. A process for producing basic lubricant additives which comprises heating at a temperature ranging from 120 to 250° C. alkyl phenol and sulphur in a molar ratio of about 0.5 mole of phenol reactant to 1.0 mole of sulphur reactant in the presence of a catalyst which is an oxide, alkoxide, hydroxide or sulfide of an element of Groups I–A or II–A of the Periodic Table, reacting the sulphurized product with an oxide, alkoxide or hydroxide of a metal of Group II–A of the Periodic Table in the presence of an amine compound of formula

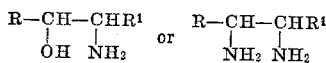

wherein R and R¹ are a hydrogen atom or an alkyl group, removing the amine compound from the mixture by distillation and adding carbon dioxide thereto at a temperature ranging from 140°–160° C. until the final product has a carbon dioxide content of between about 3.0 and 7.0% by weight.

2. A process according to claim 1 wherein the catalyst is a Group I–A metal hydroxide.

3. A process according to claim 2 wherein the catalyst is sodium hydroxide.

4. A process according to claim 1 wherein the metal of Group I–A or II–A is removed before the second stage of the reaction is carried out.

5. A process according to claim 4 wherein the metal is removed by adding phosphoric acid and removing the phosphate of the metal.

6. A process according to claim 5 wherein the metal is removed by adding sulphuric acid and removing the sulphate of the metal.

7. A process according to claim 1 wherein the alkylphenol is predominantly para-substituted.

8. A process according to claim 1 wherein the alkylphenol has from 8 to 50 carbon atoms in the alkyl substituent.

9. A process according to claim 8 wherein the alkylphenol is dodecyl phenol.

10. A process according to claim 1 wherein the Group II–A metal oxide, alkoxide or hydroxide is added as a slurry with diluent oil.

11. A process according to claim 1 wherein the Group II–A metal oxide, alkoxide or hydroxide is calcium hydroxide or barium hydroxide.

12. A process according to claim 1 wherein the amine compound is ethanolamine or ethylene diamine.

13. A process for producing basic lubricant additives which comprises heating dodecyl phenol and sulphur in a molar ratio of about 0.5 mole of phenol reactant to 1.0 mole of sulphur reactant at a temperature in the range 120° C. to 250° C. in the presence of sodium hydroxide as catalyst to form a sulphurized alkylphenol, removing sodium from the reaction mixture by adding phosphoric acid and removing sodium phosphate, reacting the sulphurized product with calcium hydroxide and an amine compound selected from the group consisting of ethanolamine and ethylene diamine. removing the amine compound from the mixture and adding carbon dioxide thereto at a temperature ranging from 140°–160° C., sufficient to give a carbon dioxide content in the range 3.0 to 7.0% by weight.

14. A process for producing basic lubricant additives which comprises heating at a temperature ranging from 120 to 250° C. an alkylphenol and sulphur in a molar ratio of about 0.5 mole of phenol reactant to 1.0 mole of sulphur reactant in the presence of a catalyst which is an oxide, alkoxide, hydroxide or sulfide of an element of Groups I–A or II–A of the Periodic Table to form a sulphurized alkylphenol, reacting the sulphurized product with an oxide, alkoxide or hydroxide of a metal of Group II–A of the Periodic Table and an amine compound of formula

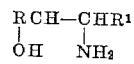

wherein R and R¹ are selected from a hydrogen atom and alkyl groups having from 1 to 3 carbon atoms, adding carbon dioxide thereto, at a temperature ranging from 140° C.–160° C. until the final product has a carbon dioxide content between about 3.0 and 7.0% by weight and removing the amine compound from the final product by distillation.

References Cited

UNITED STATES PATENTS 2,889,279 6/1959 Carlyle et al. _____ 252—18
3,424,679 1/1969 Allphin _____ 252—18 X DANIEL E. WYMAN, Primary Examiner W. H. CANNON, Assistant Examiner U.S. Cl. X.R.

252—18, 46.4